C. E. ROOSEVELT.
HARROW WEEDER TOOTH.
APPLICATION FILED APR. 21, 1913.
1,085,359.
Patented Jan. 27, 1914.
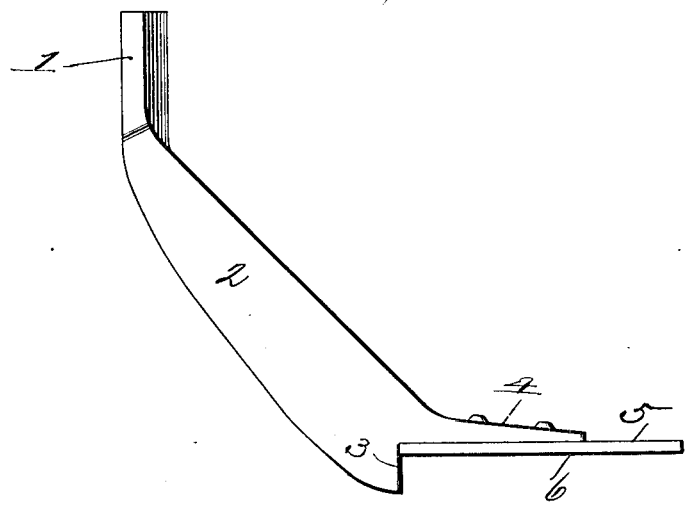
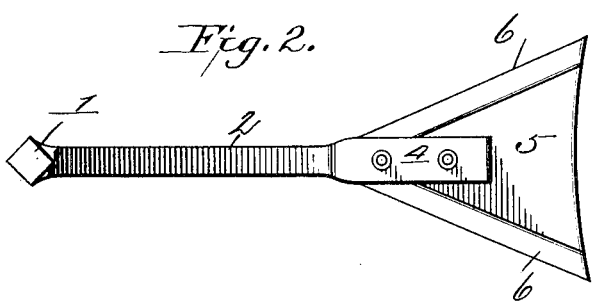
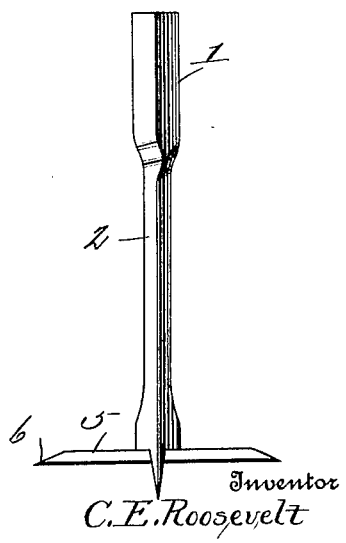
Inventor
C. E. Roosevelt

UNITED STATES PATENT OFFICE.

CLINTON E. ROOSEVELT, OF PENDLETON, OREGON.

HARROW WEEDER-TOOTH.

1,085,359.   Specification of Letters Patent.   Patented Jan. 27, 1914.

Application filed April 21, 1913. Serial No. 762,706.

*To all whom it may concern:*

Be it known that I, CLINTON E. ROOSEVELT, a citizen of the United States, residing at Pendleton, in the county of Umatilla and State of Oregon, have invented a new and useful Improvement in Harrow Weeder-Teeth, of which the following is a specification.

This invention relates to a weeder tooth for harrows, the object of the invention being to cut or force down any obstructions which the tooth may meet in its travel through the soil, and at the same time to undercut and dislodge weeds.

It has been found by experiments that many very troublesome weeds can be completely eradicated from the fields if they are cut off slightly below the ground, whereas simply mowing often proves rather beneficial.

The invention consists of the novel features of construction hereinafter fully described, pointed out in the claim and shown in the accompanying drawings, in which—

Figure 1 is a side view. Fig. 2 is a top plan view. Fig. 3 is a front edge view.

In these drawings, 1 represents the tooth shank adapted to be secured to a bar, beam, or other part of a harrow or similar frame, and 2 is a combined shank and cutting blade. This shank portion 2 is triangular in cross section whereas the portion 1 is square in cross section, and rests in a vertical position. The triangular shank portion 2 is inclined downwardly and rearwardly and is sharpened upon its front edge. By reason of the inclination of this portion 2 and also by reason of its being sharpened upon its front edge it will pass readily through the ground and will cut an ordinary obstruction, or if it does not cut it will force it downwardly and will carry it to a point below the root cutting blade 5.

The lower part of the portion 2 is cut out as shown at 3 and is also provided with the rearwardly extending member 4. Fitting in the cut out portion 3 and riveted or otherwise secured to the member 4 is a triangular cutting blade 5 having its apex in the cut out portion 3 and having the cutting edges 6.

It will be noted that the front blade portion or cutting edge of the inclined portion 2 extends below the blade 6, thereby forcing downwardly any obstruction which might otherwise be engaged by the plate 5. This leaves the cutting edges of the plate or blade 5 free to act upon the roots of the weeds, all trash, such as small sticks, branches, small stones being dislodged and forced downwardly by the portion 2. This also stirs and cuts the ground at a point below the blade 5 and this cutting action is especially valuable when the blade 5 is employed as a mulcher. When used for this purpose the inclined portion 2 will cut into the ground to a slightly greater depth than the travel of the plate 5 and the latter will break up the surface soil and will leave it lying loosely upon the top of the ground in the form of a mulch. By positioning the tooth so as to slightly elevate the forward end of the plate blade 5 the device is especially adapted for use as a sub soil packer on light lands.

It will therefore be seen that while the device is intended mainly for the eradication of weeds it is also adapted for use as a cultivator.

While I have shown the triangular plate 5 as being formed of a separate piece and riveted to the shank 2 it will of course be obvious that if desired the shank 2 in said plate or blade 5 could be integral, without in any way altering the shape of the parts or affecting their operation.

What I claim is:—

A tooth of the kind described comprising a vertical shank portion square in cross section, a downwardly and rearwardly extending shank portion triangular in cross section and having its front edge sharpened, the said shank being cut away adjacent its lower end, and a triangular shaped plate secured in said cut-out portion, the apex of said plate resting against said shank and the sides of said plate being sharpened, as and for the purpose set forth.

CLINTON E. ROOSEVELT.

Witnesses:
H. E. BICKERS,
W. GARA.

---

Copies of this patent may be obtained for five cents each, by addressing the "Commissioner of Patents, Washington, D. C."